(12) United States Patent
Xie et al.

(10) Patent No.: US 12,136,239 B2
(45) Date of Patent: Nov. 5, 2024

(54) ELECTRO-HYDRAULIC VARIFOCAL LENS-BASED METHOD FOR TRACKING THREE-DIMENSIONAL TRAJECTORY OF MOVING OBJECT

(71) Applicant: SHANGHAI UNIVERSITY, Shanghai (CN)

(72) Inventors: Shaorong Xie, Shanghai (CN); Hengyu Li, Shanghai (CN); Jingyi Liu, Shanghai (CN); Yueying Wang, Shanghai (CN); Shuang Han, Shanghai (CN); Jun Luo, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 192 days.

(21) Appl. No.: 17/898,861

(22) Filed: Aug. 30, 2022

(65) Prior Publication Data
US 2023/0111657 A1   Apr. 13, 2023

(30) Foreign Application Priority Data
Aug. 30, 2021 (CN) .......................... 202111009365.7
Oct. 9, 2021 (CN) .......................... 202111176063.9

(51) Int. Cl.
*G06T 7/80* (2017.01)
*G02B 3/14* (2006.01)
(Continued)

(52) U.S. Cl.
CPC .................. *G06T 7/80* (2017.01); *G02B 3/14* (2013.01); *G02B 7/28* (2013.01); *H04N 23/67* (2023.01)

(58) Field of Classification Search
CPC ........... G06T 7/246; G06T 2207/30241; G06T 7/254; G06T 2207/10016;
(Continued)

(56) References Cited

U.S. PATENT DOCUMENTS

2021/0155266 A1* 5/2021 Sun .......................... G06N 3/045
2022/0405506 A1* 12/2022 Taamazyan ............... G06T 7/50
(Continued)

OTHER PUBLICATIONS

Xiang Cheng et al (An entirely soft varifocal lens based on an electro-hydraulic actuator) (Year: 2020).*
(Continued)

*Primary Examiner* — Masum Billah

(57) ABSTRACT

The present disclosure discloses an electro-hydraulic varifocal lens-based method for tracking a 3D trajectory of a moving object. The method includes the following steps of: (1) obtaining a functional relation between a focusing control current and camera's intrinsic parameters; (2) obtaining a functional relation between focusing control currents of the electro-hydraulic varifocal lens and an optimal object distance; (3) initializing an object tracking algorithm, and taking an object tracking box as a subsequent focusing window; (4) carrying out first autofocusing, recording a focusing control current value after the autofocusing is completed, as well as a size and center point coordinates of the object tracking box; (5) calculating and recording coordinates of the object in 3D space; and (6) repeating steps (4) and (5) for the same object, and sequentially connecting the recorded coordinates of the object in 3D space into a trajectory.

8 Claims, 1 Drawing Sheet

(51) Int. Cl.
*G02B 7/28* (2021.01)
*H04N 23/67* (2023.01)

(58) Field of Classification Search
CPC . G06T 2207/20081; G06T 2207/30232; G06T 7/215; G06T 7/80; H04N 13/239; H04N 13/271; H04N 2013/0081; H04N 23/67; H04N 23/69; H04N 23/80; H04N 13/189; H04N 13/194; H04N 13/221
USPC .......................................................... 348/169
See application file for complete search history.

(56) References Cited

U.S. PATENT DOCUMENTS

2023/0065922 A1\* 3/2023 Okur .................... G06V 20/52
2023/0419629 A1\* 12/2023 Huang .................. G06T 7/596

OTHER PUBLICATIONS

Melissa Bosch et al. (Electrically Actuated Varifocal Lens Based on Liquid-Crystal-Embedded Dielectric Metasurfaces) (Year: 2021).\*

\* cited by examiner

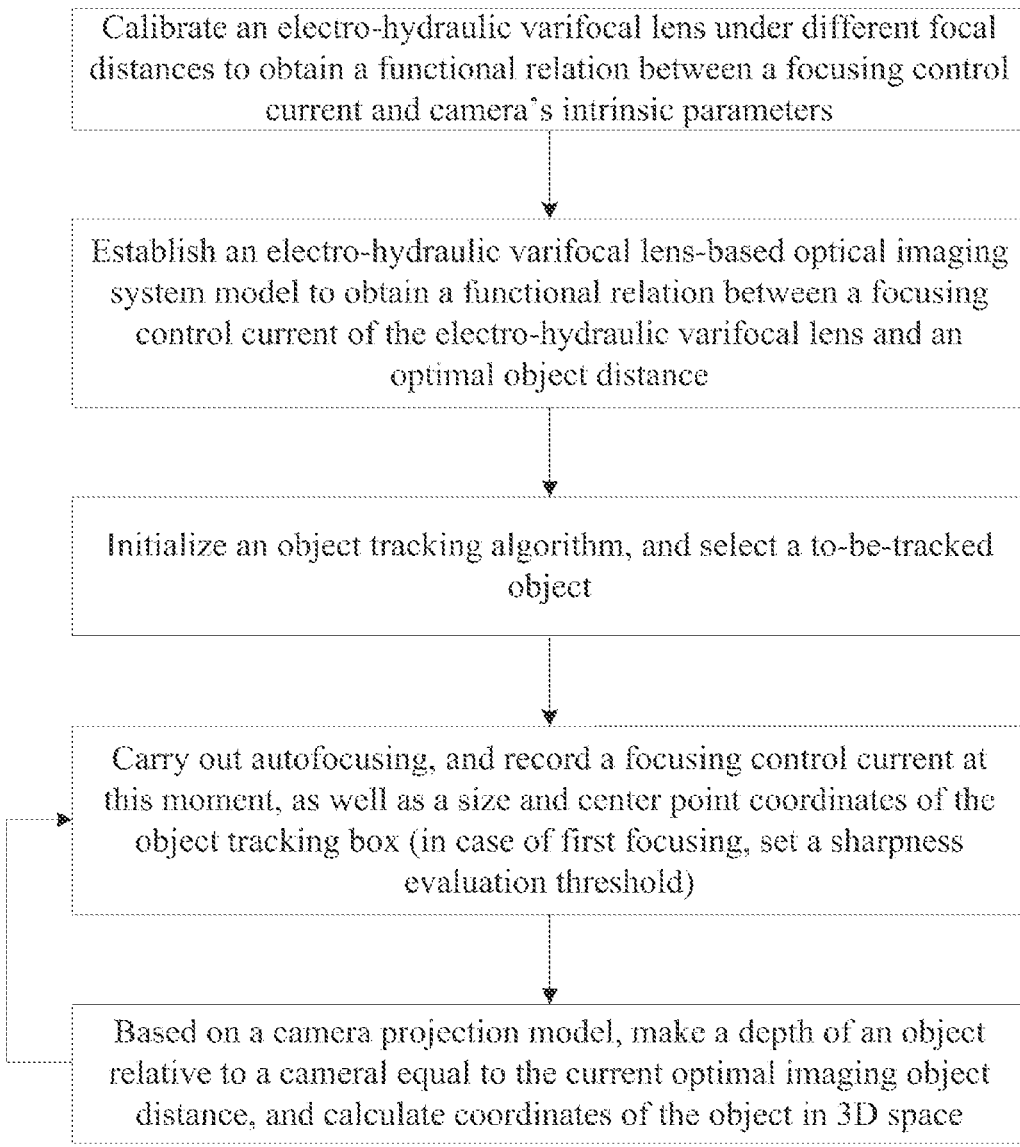

ELECTRO-HYDRAULIC VARIFOCAL LENS-BASED METHOD FOR TRACKING THREE-DIMENSIONAL TRAJECTORY OF MOVING OBJECT

CROSS REFERENCE TO RELATED APPLICATION

This patent application claims the benefit and priority of Chinese Patent Application No. 202111176063.9, filed on Oct. 9, 2021, which claims the benefit and priority of Chinese Patent Application No. 202111009365.7, filed on Aug. 30, 2021, the disclosure of which is incorporated by reference herein in its entirety as part of the present application.

TECHNICAL FIELD

The present disclosure belongs to the field of computer vision, and relates to the technical field of methods for moving object tracking, in particular to an electro-hydraulic varifocal lens-based method for tracking a three-dimensional (3D) trajectory of a moving object.

BACKGROUND ART

Visual object tracking is not only one of the basic visual functions for human beings, but also a fundamental and important research topic in the field of computer vision, which has received constant attention from multidisciplinary researchers, including researchers on neuroscience and computer science. However, most of the current visual object tracking methods focus on tracking on a two-dimensional image plane, but less on three-dimensional trajectory tracking. Tracking an object simply on a two-dimensional plane may greatly limit the application scenarios of object tracking technique.

At present, 3D trajectory tracking for a visual object is mainly achieved by stereoscopic vision methods, which recover depth information lost during the process of camera projection through devices such as a binocular camera or multiple cameras, depth cameras and laser radars. These methods, however, have the disadvantages of complex structure and high equipment cost. In addition, depth cameras and laser radars are also limited by their small range, making it impossible to track an object from a distance.

SUMMARY

An objective of the present disclosure is to provide an electro-hydraulic varifocal lens-based method for tracking a three-dimensional (3D) trajectory of a moving object.

To achieve the aforementioned objective, the present disclosure adopts the following technical solution:

an electro-hydraulic varifocal lens-based method for tracking a 3D trajectory of a moving object, including:
    step 1, calibrating the electro-hydraulic varifocal lens under different focal distances to obtain a functional relation between a focusing control current and camera's intrinsic parameters;
    step 2, establishing an electro-hydraulic varifocal lens-based optical imaging system model to obtain a functional relation between a focusing control current of the electro-hydraulic varifocal lens and an optimal object distance;
    step 3, initializing an object tracking algorithm, generating an object tracking box, and selecting a to-be-tracked object, where the object tracking box is taken as a subsequent focusing window;
    step 4, carrying out first autofocusing to make a sharpness evaluation value in the object tracking box of an image greater than a preset threshold K, and recording a focusing control current $I_i$ after the autofocusing is completed, as well as a size $size_i$ of the object tracking box in the image and center point coordinates $(x_i, y_i)$ of the object tracking box after undistortion;
    step 5, substituting intrinsic parameters ($f_{xi}$, $f_{yi}$, $c_x$, $c_y$, s and distortion parameters) and an optimal object distance $u_i$ corresponding to the focusing control current value $I_i$, and the center point coordinates $(x_i, y_1)$ of the object tracking box after undistortion into a camera projection model, and calculating and recording coordinates $(X_i, Y_i, Z_i)$ of the object in 3D space;
    step 6, repeating steps 4-5 for the same tracked object, and sequentially connecting the recorded coordinates of the object in 3D space into a trajectory (equivalent to a 3D trajectory of the tracked moving object).

Further, step 1 specifically includes calibrating the electro-hydraulic varifocal lens under multiple focusing control currents to obtain the functional relation between the focusing control current and the camera's intrinsic parameters by curve fitting:

$$(f_x, f_y) = H(I) \tag{1}$$

where $f_x$ and $f_y$ denote parameters in the camera's intrinsic parameters that change with the focal distance, and are physically defined as equivalent focal distances of a camera in x and y directions of a pixel plane respectively, in a unit of px; and I denotes a focusing control current of an electro-hydraulic varifocal lens; and obtaining camera's intrinsic parameters $c_x$, $c_y$, s and distortion parameters (the quantity of the distortion parameters depends on the calibration method used) that do not change with the focal distance, where $c_x$ and $c_y$ are physically defined as the coordinates of a camera's optical center on the pixel plane, and s is physically defined as a slant parameter between the horizontal and vertical edges of a camera's photosensitive element, all of which are constants obtainable in calibration.

Further, said establishing a functional relation between a focusing control current of the electro-hydraulic varifocal lens and an optimal object distance in step 2 specifically includes:

recording an optimal object distance under multiple focusing control currents by using the electro-hydraulic varifocal lens-based optical imaging system model obtained via modeling, and conducting curve fitting on the recorded data to obtain a functional relation between the focusing control currents of the electro-hydraulic varifocal lens and the optimal object distance:

$$u = F(I) \tag{2}$$

where u denotes an optimal object distance, and I denotes a focusing control current of the electro-hydraulic varifocal lens.

Further, the autofocusing in step 4 includes first autofocusing and subsequent autofocusing, and the first autofocusing specifically includes: (1) searching an initial focusing control current (corresponding to a shortest or longest focal distance) at a certain stride t, calculating a sharpness evaluation value for an internal image region of the object tracking box, obtaining a maximum sharpness evaluation value $D_{max}$ and a focusing control current $I_1$ corresponding to the maximum sharpness evaluation value, and setting a sharpness evaluation threshold:

$$K = \alpha D_{max} \quad (3)$$

where $\alpha$ denotes a preset sharpness confidence level ($\alpha < 1$); and K denotes a preset sharpness evaluation threshold used in the subsequent autofocusing; and (2) after autofocusing is finished, recording a size $size_1$ of the object tracking box in an image and center point coordinates $(x_1, y_1)$ of the object tracking box after undistortion.

The subsequent autofocusing specifically includes: calculating a sharpness evaluation value $D_i$ of the internal image region of the object tracking box; and if $D_i \geq K$, directly recording the focusing control current $I_i$ at this moment, as well as a size $size_i$ of the object tracking box in an image and center point coordinates $(x_i, y_i)$ of the object tracking box after undistortion; or if $D_i < K$, reading a size $size_i$ of the object tracking box in the image at this moment, comparing the size with a size $size_{i-1}$ of the object tracking box at last successful focusing (that is, $D_i \geq K$) if $size_i < size_{i-1}$, searching the focusing control current at a certain stride t in the direction where the optimal object distance becomes longer, calculating a sharpness evaluation value in the object tracking box, and completing focusing after the sharpness evaluation value is greater than or equal to the threshold K; or if $size_i > size_{i-1}$, searching the focusing control current at a certain stride t in the direction where the optimal object distance becomes shorter, calculating a sharpness evaluation value in the object tracking box, and completing focusing after the sharpness evaluation value is greater than or equal to the threshold K; and after the focusing is completed, recording the searched focusing control current $I_i$ and the size $size_i$ of the object tracking box in the image after focusing and center point coordinates $(x_i, y_i)$ of the object tracking box after undistortion.

Further, the undistortion in step 4 specifically includes: calculating, by a distortion model used in the selected calibration method, an undistorted image of a current frame, and reading and recording center point coordinates $(x_i, y_i)$ of the object tracking box in the image after undistortion (namely, undistorted image).

Further, the camera projection model in step 5 is as follows:

$$\begin{pmatrix} x_i \\ y_i \\ 1 \end{pmatrix} = \frac{1}{Z_i} \begin{pmatrix} f_{xi} & s & c_x \\ 0 & f_{yi} & c_y \\ 0 & 0 & 1 \end{pmatrix} \begin{pmatrix} X_i \\ Y_i \\ Z_i \end{pmatrix} \quad (4)$$

where $(x_i, y_i)$ denote center point coordinates after undistortion, $c_x$, $c_y$, and s are camera's intrinsic parameters obtained during calibration and do not vary with the focal distance, $f_{xi}$, $f_{yi}$, denote equivalent focal distances of the camera in the x and y directions obtained by substituting a focusing control current $I_i$ at this moment into the calibration formula (1), and $(X_i, Y_i, Z_i)$ denote 3D coordinates of a center point of the tracked object; the 3D coordinates $(X_i, Y_i, Z_i)$ of the center point of the tracked object can be calculated by substituting center point coordinates $(x_i, y_i)$ of the object tracking box after undistortion obtained in step 4, the camera's intrinsic parameters obtained during calibration and $Z_i = u_i$ into the above camera projection model; and $u_i$ denotes an optimal object distance obtained by substituting a focusing control current $I_i$ at this moment into formula (2).

Further, the sharpness evaluation value is calculated using a Laplacian function, and the Laplacian function is expressed as:

$$D(f) = \sum_y \sum_x |G(x, y)| \quad (5)$$

where $G(x, y)$ denotes convolution of a Laplacian operator at a pixel point $(x, y)$, and the Laplacian operator is expressed as:

$$L = \frac{1}{6}\begin{bmatrix} 1 & 4 & 1 \\ 4 & -20 & 4 \\ 1 & 4 & 1 \end{bmatrix}. \quad (6)$$

The present disclosure has the following beneficial effects over the prior art:

In the present disclosure, the electro-hydraulic varifocal lens is used, which has the advantages of fast focusing response speed, low energy consumption, compact structure, high repeated positioning accuracy, and fast and accurate focusing; by modeling the optical imaging system of the lens, the function relation between the focal distance of the electro-hydraulic varifocal lens and the optical imaging object distance can be obtained by modeling the optical imaging system of the lens according to the correlation among the control current of the lens, the focal distance and the optical imaging object distance; and when the object is in focus after autofocusing, the depth information of the object can be obtained by using this functional relation. The present disclosure provides a new method for tracking a 3D trajectory of an object. The electro-hydraulic varifocal lens keeps the object to be in focus, and the optimal object distance is taken as the depth of the object relative to the camera. In this way, the depth information lost in the process of projecting the object to a camera imaging plane can be recovered, and the 3D trajectory of the object can thus be tracked with simple structure and relatively low cost.

The present disclosure does not require stereo vision equipment with complex structure and large size, and can track the 3D trajectory of the object simply using a single camera, which is less costly. According to the present disclosure, the 3D trajectory of the object can be tracked, in the meanwhile, the tracked object can be kept in focus in the image through autofocusing, which improves the stability of the object tracking algorithm used, marking a significant progress compared with the prior art.

BRIEF DESCRIPTION OF THE DRAWINGS

FIG. 1 is a flow chart according to Embodiment 1 of the present disclosure.

DETAILED DESCRIPTION OF THE EMBODIMENTS

Embodiment 1

The present disclosure provides an electro-hydraulic varifocal lens-based method for tracking a three-dimensional (3D) trajectory of a moving object, including:

step 1, calibrate, based on Zhang Zhengyou Calibration Method, the electro-hydraulic varifocal lens under different focal distances to obtain a functional relation between a focusing control current and camera's intrinsic parameters;

step 1 specifically includes calibrating the electro-hydraulic varifocal lens under multiple focusing control currents to obtain corresponding $f_x$, $f_y$, and obtaining a functional relation between a focusing control current and camera's intrinsic parameters by curve fitting:

$$(f_x, f_y) = H(I) \quad (1)$$

where $f_x$ and $f_y$ denote parameters in the camera's intrinsic parameters that change with the focal distance, and as physically defined as equivalent focal distances of a camera in x and Y directions of a pixel plane, in a unit of px; and I denotes a focusing control current of an electro-hydraulic varifocal lens.

In the meanwhile, obtain camera's intrinsic parameters $c_x$, $c_y$, s and distortion parameters $k_1$, $k_2$ (only radial distortion is considered in the Zhang Zhengyou Calibration Method) that do not change with the focal distance, where $c_x$ and $c_y$ are physically defined as the coordinates of a camera's optical center on the pixel plane, and s is physically defined as a slant parameter between the horizontal and vertical edges of a camera's photosensitive element, all of which are constants obtainable in calibration.

step 2, establish, by Zemax software, an electro-hydraulic varifocal lens-based optical imaging system model, and set the radius, thickness, curvature, material and other parameters of the electro-hydraulic varifocal lens used in Zemax software, so as to obtain a functional relation between a focusing control current of the electro-hydraulic varifocal lens and an optimal object distance;

step 2 specifically includes recording an optimal object distance under multiple focusing control currents by using the electro-hydraulic varifocal lens-based optical imaging system model constructed by the Zemax software, and conducting curve fitting on the recorded data to obtain a functional relation between focusing control currents of the electro-hydraulic varifocal lens and the optimal object distance:

$$u = F(I) \quad (2)$$

where u denotes an optimal object distance, and I denotes a focusing control current of the electro-hydraulic varifocal lens.

step 3, initialize an object tracking algorithm, and select a to-be-tracked object, where the object tracking box is taken as a subsequent focusing window; generally, the object tracking algorithm can be divided into: first, correlation filtering methods, such as CSK, KCF/DCF, CN, etc.; second, depth learning methods, such as C-COT, ECO and DLT; both methods can be selected in the present disclosure, and the KCF algorithm is selected in the present embodiment.

step 4, carry out first autofocusing to make a sharpness evaluation value in an object tracking box in an image greater than a preset threshold K, and record a focusing control current $I_i$ after the autofocusing is completed, as well as a size $size_i$ of the object tracking box in the image and center point coordinates $(x_i, y_i)$ of the object tracking box after undistortion;

the autofocusing includes first autofocusing and subsequent autofocusing, and the first autofocusing specifically includes: (1) searching an initial focusing control current (focusing control current corresponding to a shortest or longest focal distance) at a certain stride $t=(b-a)/1000$, where a denotes a minimum focusing control current, and b denotes a maximum focusing control current; and calculating a sharpness evaluation value for an internal image region of the object tracking box, obtaining a maximum sharpness evaluation value $D_{max}$ and a focusing control current $I_1$ corresponding to the maximum sharpness evaluation value, and setting a sharpness evaluation threshold:

$$K = \alpha D_{max} \quad (3)$$

where $\alpha$ denotes a preset sharpness confidence level ($\alpha < 1$); and K denotes a preset sharpness evaluation threshold used in the subsequent autofocusing.

The sharpness evaluation value is calculated by the sharpness evaluation function, and the sharpness evaluation function can be commonly used SMD function, EOG function, Roberts function, Tenengrad function, Brenner function, Laplacian function or SML function. For ease of understanding, the Laplacian function is selected for calculation in this embodiment, which is expressed as:

$$D(f) = \Sigma_y \Sigma_x |G(x,y)| \quad (5)$$

where $G(x, y)$ denotes convolution of a Laplacian operator at a pixel point $(x, y)$, and the Laplacian operator is expressed as:

$$L = \frac{1}{6}\begin{bmatrix} 1 & 4 & 1 \\ 4 & -20 & 4 \\ 1 & 4 & 1 \end{bmatrix} \quad (6)$$

(2) after autofocusing is finished, record a size $size_1$ of the object tracking box in an image and center point coordinates $(x_1, y_1)$ after undistortion (namely, center point coordinates of the object tracking box in an undistorted image).

The subsequent autofocusing specifically includes: calculating a sharpness evaluation value $D_i$ of the internal image region of the object tracking box; and if $D_i \geq K$, directly recording the focusing control current $I_i$ at this moment, as well as a size $size_i$ of the object tracking box in an image and center point coordinates $(x_i, y_i)$ of the object tracking box after undistortion; or if $D_i < K$, reading a size $size_i$ of the object tracking box in the image at this moment, comparing the size with a size $size_{i-1}$ of the object tracking box at last successful focusing; if $size_i < size_{i-1}$, searching the focusing control current at a certain stride t in the direction where the optimal object distance becomes longer, calculating a sharpness evaluation value in the object tracking box, and completing focusing after the sharpness evaluation value is greater than or equal to the sharpness evaluation threshold; or if $size_i > size_{i-1}$, searching the focusing control current at a certain stride tin the direction where the optimal object distance becomes shorter, calculating a sharpness evaluation value in the object tracking box, and completing focusing after the sharpness evaluation value is greater than or equal to the sharpness evaluation threshold; and after the focusing is completed, recording the searched focusing control current $I_i$ and the size $size_i$ of the object tracking box in the image after focusing and center point coordinates $(x_i, y_i)$ after undistortion.

The undistortion specifically includes: calculating, by a distortion model used in the selected calibration method, an undistorted image of a current frame and reading and recording center point coordinates $(x_i, y_i)$ of the object tracking box in the undistorted image.

The radial distortion model used in the Zhang Zhengyou Calibration Method is:

$$x_{distorted}=x(1+k_1 r^2+k_2 r^4) \quad (7)$$

$$y_{distorted}=y(1+k_1 r^2+k_2 r^4) \quad (8)$$

$$r=\sqrt{x^2+y^2} \quad (9)$$

where $x_{distorted}$, $y_{distorted}$ denote pixel coordinates after distortion of an image, x and y are ideal pixel coordinates for undistortion, and $k_1$, $k_2$ denote distortion parameters obtained by calibration. Calculate, by the above distortion model, an undistorted image of a current frame, and read and record center point coordinates $(x_i, y_i)$ of the object tracking box in the image after undistortion.

step 5, substitute a focusing control current value $I_i$, corresponding intrinsic parameters $f_{xi}$, $f_{yi}$, $c_x$, $c_y$, s, distortion parameters $k_1$ and $k_2$, and an optimal object distance u and the center point coordinates $(x_i, y_i)$ of the object tracking box after undistortion into a camera projection model, and calculate and record coordinates $(X_i, Y_i, Z_i)$ of the object in 3D space; where the camera projection model is:

$$\begin{pmatrix} x_i \\ y_i \\ 1 \end{pmatrix} = \frac{1}{Z_i} \begin{pmatrix} f_{xi} & s & c_x \\ 0 & f_{yi} & c_y \\ 0 & 0 & 1 \end{pmatrix} \begin{pmatrix} X_i \\ Y_i \\ Z_i \end{pmatrix} \quad (4)$$

where $(x_i, y_i)$ denote center point coordinates after undistortion, $c_x$, $c_y$, and s are camera's intrinsic parameters obtained during calibration and do not vary with the focal distance, $f_{xi}$, $f_{yi}$ denote equivalent focal distances of the camera in the x and y directions obtained by substituting a focusing control current $I_{ti}$ at this moment into the calibration formula (1), and $(X_i, Y_i, Z_i)$ denote 3D coordinates of a center point of the tracked object; and the 3D coordinates $(X_i, Y_i, Z_i)$ of the center point of the tracked object can be calculated by substituting center point coordinates $(x_i, y_i)$ of the object tracking box after undistortion obtained in step 4, the camera's intrinsic parameters obtained during calibration and $Z_i=u_i$ ($u_i$ denotes an optimal object distance by substituting the focusing control current $I_i$ at this moment into formula (2)) into the above camera projection model;

step 6, repeat steps 4-5 for the same tracked object, and sequentially connect the recorded coordinates of the object in 3D space into a trajectory (equivalent to a 3D trajectory of the tracked moving object).

The present disclosure does not require stereo vision equipment with complex structure and large size, and can track the 3D trajectory of the object simply using a single camera, which is less costly. According to the present disclosure, the 3D trajectory of the object can be tracked, in the meanwhile, the tracked object can be kept in focus in the image through autofocusing, which improves the stability of the object tracking algorithm used, marking a significant progress compared with the prior art.

Embodiment 2

Compared with Embodiment 1, step 4 in this embodiment includes: directly calling an undistortion function of OpenCV, introducing distortion parameters $k_1$, $k_2$ obtained through calibration, conducting undistorting on an image, calculating an undistorted image of a current frame, and reading and recording center point coordinates $(x_i, y_i)$ of an object tracking box in the image after undistortion.

What is claimed is:

1. An electro-hydraulic varifocal lens-based method for tracking a three-dimensional (3D) trajectory of a moving object, comprising:

step 1, calibrating an electro-hydraulic varifocal lens under different focal distances to obtain a functional relation between a focusing control current and a camera's intrinsic parameters;

step 2, establishing an electro-hydraulic varifocal lens-based optical imaging system model to obtain a functional relation between a focusing control current of the electro-hydraulic varifocal lens and an optimal object distance;

step 3, initializing an object tracking algorithm, generating an object tracking box, and selecting a to-be-tracked object;

step 4, carrying out autofocusing, and recording a focusing control current after the autofocusing is completed, as well as a size of the object tracking box in an image and center point coordinates after undistortion; wherein the autofocusing in step 4 comprises first autofocusing and subsequent autofocusing, and the first autofocusing specifically comprises:

searching an initial focusing control current at a certain stride, calculating a sharpness evaluation value of an internal image region of the object tracking box, obtaining a maximum sharpness evaluation value and a focusing control current corresponding to the maximum sharpness evaluation value, and setting a sharpness evaluation threshold:

$$K=\alpha D_{max} \quad (3)$$

wherein α denotes a preset sharpness confidence level, and α<1; K denotes a sharpness evaluation threshold used in the subsequent autofocusing; and $D_{max}$ denotes a maximum sharpness evaluation value; and after the first autofocusing is finished, recording a size of the object tracking box in an image and center point coordinates after undistortion;

wherein the subsequent autofocusing specifically comprises:

calculating a sharpness evaluation value $D_i$ of the internal image region of the object tracking box; and if $D_i>K$, directly recording the focusing control current $I_i$ at this moment, as well as a size $size_i$ of the object tracking box in an image and center point coordinates after undistortion; or if $D_i<K$, reading a size $size_i$ of the object tracking box in the image at this moment, comparing the size with a size $size_{i-1}$ of the object tracking box at last successful focusing, and adjusting a focusing control current to complete focusing; and after the focusing is completed, recording the focusing control current and the size of the object tracking box in the image after focusing and center point coordinates after undistortion;

step 5, calculating and recording, by a camera projection model, coordinates of the object in 3D space; and wherein the camera projection model in step 5 is:

wherein $(x_i, y_i)$ denote center point coordinates of an object tracking box in an undistorted image, cx and cy denote coordinates of a camera's optical center on a pixel plane, s denotes a slant parameter between horizontal and vertical edges of a camera's photosensitive element, $f_{xi}$, $f_{yi}$ denote equivalent focal distances of a camera in x and y directions corresponding to a focusing control current $I_i$ at this moment respectively, and $(X_i, Y_i, Z_i)$ denote 3D coordinates of a center point of a tracked object; and $Z_i=u_i$, wherein $u_i$ denotes an optimal object distance corresponding to the focusing control current Ii at this moment;

step 6, repeating steps 4-5 for the same tracked object, and sequentially connecting the recorded coordinates of the object in 3D space into a trajectory.

2. The electro-hydraulic varifocal lens-based method for tracking a 3D trajectory of a moving object according to claim 1, wherein step 1 specifically comprises calibrating the electro-hydraulic varifocal lens under multiple focusing control currents to obtain the functional relation between the focusing control current and the camera's intrinsic parameters by curve fitting:

$$(f_x, f_y) = H(I) \qquad (1)$$

wherein $f_x$ and $f_y$ denote equivalent focal distances of a camera in x and y directions of the pixel plane respectively, in a unit of px; and I denotes a focusing control current of an electro-hydraulic varifocal lens; and obtaining coordinates of a camera's optical center on the pixel plane, and a slant parameter between horizontal and vertical edges of a camera's photosensitive element.

3. The electro-hydraulic varifocal lens-based method for tracking a 3D trajectory of a moving object according to claim 2, wherein step 2 specifically comprises recording an optimal object distance under multiple focusing control currents by using the electro-hydraulic varifocal lens-based optical imaging system model, and conducting curve fitting on the recorded data to obtain a functional relation between focusing control currents of the electro-hydraulic varifocal lens and the optimal object distance:

$$u = F(I) \qquad (2)$$

wherein u denotes an optimal object distance, and I denotes a focusing control current of the electro-hydraulic varifocal lens.

4. The electro-hydraulic varifocal lens-based method for tracking a 3D trajectory of a moving object according to claim 1, wherein when $D_i<K$, the focusing control current is adjusted based on a comparison result of $size_i$ and $size_{i-1}$, which specifically comprises:

if $size_i<size_{i-1}$, searching the focusing control current at a certain stride in the direction where the optimal object distance becomes longer, calculating a sharpness evaluation value in the object tracking box, and completing focusing after the sharpness evaluation value is greater than or equal to the sharpness evaluation threshold; or if $size_i>size_{i-1}$, searching the focusing control current at a certain stride in the direction where the optimal object distance becomes shorter, calculating a sharpness evaluation value in the object tracking box, and completing focusing after the sharpness evaluation value is greater than or equal to the sharpness evaluation threshold.

5. The electro-hydraulic varifocal lens-based method for tracking a 3D trajectory of a moving object according to claim 4, wherein the undistortion in step 4 specifically comprises: calculating an undistorted image of a current frame according to a distortion model, and reading and recording center point coordinates of the object tracking box in the undistorted image.

6. The electro-hydraulic varifocal lens-based method for tracking a 3D trajectory of a moving object according to claim 5, wherein the sharpness evaluation value is calculated using a Laplacian function, and the Laplacian function is expressed as:

$$D(f) = \Sigma_y \Sigma_x |G(x,y)| \qquad (5)$$

wherein $G(x, y)$ denotes convolution of a Laplacian operator at a pixel point $(x, y)$, and the Laplacian operator is expressed as:

$$L = \frac{1}{6}\begin{bmatrix} 1 & 4 & 1 \\ 4 & -20 & 4 \\ 1 & 4 & 1 \end{bmatrix}. \qquad (6)$$

7. The electro-hydraulic varifocal lens-based method for tracking a 3D trajectory of a moving object according to claim 4, wherein the sharpness evaluation value is calculated using a Laplacian function, and the Laplacian function is expressed as:

$$D(f) = \sum_y \sum_x |G(x, y)| \qquad (5)$$

wherein $G(x, y)$ denotes convolution of a Laplacian operator at a pixel point $(x, y)$, and the Laplacian operator is expressed as:

$$L = \frac{1}{6}\begin{bmatrix} 1 & 4 & 1 \\ 4 & -20 & 4 \\ 1 & 4 & 1 \end{bmatrix}. \qquad (6)$$

8. The electro-hydraulic varifocal lens-based method for tracking a 3D trajectory of a moving object according to claim 1, wherein the sharpness evaluation value is calculated using a Laplacian function, and the Laplacian function is expressed as:

$$D(f) = \sum_y \sum_x |G(x, y)| \qquad (5)$$

wherein $G(x, y)$ denotes convolution of a Laplacian operator at a pixel point $(x, y)$, and the Laplacian operator is expressed as:

$$L = \frac{1}{6}\begin{bmatrix} 1 & 4 & 1 \\ 4 & -20 & 4 \\ 1 & 4 & 1 \end{bmatrix}. \qquad (6)$$

\* \* \* \* \*